UNITED STATES PATENT OFFICE

HANS SCHINDHELM, OF FRANKFORT-ON-THE-MAIN-FECHENHEIM, GERMANY, ASSIGNOR TO GENERAL ANILINE WORKS, INC., OF NEW YORK, N. Y., A CORPORATION OF DELAWARE

HALOGEN-TEREPHTHALIC-HEXAHALIDES AND PROCESS OF PREPARING SAME

No Drawing. Application filed November 9, 1928, Serial No. 318,314, and in Germany November 11, 1927.

I have found that by treatment with halogens halogen-derivatives of para-xylene of the formula:

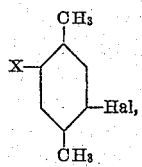

wherein X means hydrogen or halogen, are entirely halogenized in the side chains and the new hexahalogeno compounds of the formula:

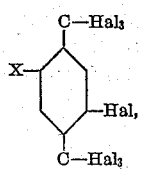

wherein X has the same signification, are obtained. The halogenation is advantageously carried out under exposure to light. By saponification in the usual manner the new hexahalogeno compounds form mono- and dihalogenated derivatives of the terephthalic acid of the formula:

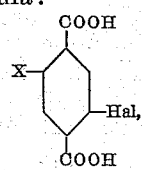

wherein X has the aforesaid signification.

Whereas the mono- and dihalogenated derivatives of terephthalic acid could hitherto only be produced in a very complicated manner and with a small yield, they are obtained according to my present process in a pure state with a good yield. They may be employed as starting materials for the production of dyestuffs and of pharmaceutical products.

In order to further illustrate my invention the following examples are given, the parts being by weight and all temperatures in centigrade degrees, but I wish it to be understood that I am not limited to the particular products nor reaction conditions mentioned therein.

Example 1

281 parts of 1.4-dimethyl-2-chlorobenzene are treated at 150–200° with chlorine, while exposed to an intense light, until no more chlorine is absorbed. In this manner 406 parts of chlorine are taken up. When cool, the mass solidifies in a crystallized form and can be used immediately for the further process. The new mono-chloro-terephthalic hexachloride of the formula:

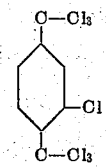

may be isolated therefrom in a pure state in the usual manner, it represents at ordinary temperature a crystallized substance, boiling under atmospheric pressure above 300°.

In order to saponify the monochloro-terephthalic hexachloride thus obtained, 347.5 parts of the raw product are introduced into 1200 parts of sulfuric acid of 66° Bé. At 70°–80° a violent reaction takes place. The mixture is maintained at this temerature until the evolution of hydrochloric acid ceases. In this manner 216 parts of hydrochloric acid are split off. The mass is worked up by pouring it into ice. The 2-chloro-terephthalic acid thus isolated corresponds to the formula:

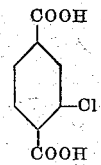

It may be recrystallized from alcohol of 50%. It melts above 300°. Its dimethylester melts at 60° as described in literature (Beilstein, ed. 4, vol. 9, page 847).

Example 2

1.4-dimethyl-2.5-dichlorobenzene is treated at about 180° with chlorine, while exposed to light, until no more chlorine is taken up. The absorbed amount of chlorine corresponds approximately to 6 atoms. The new 2.5-dichloro-terephthalic hexachloride thus obtained of the formula:

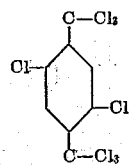

is a colorless liquid boiling under the ordinary pressure above 300°.

In order to saponify the 2.5-dichloro-terephthalic hexachloride 526 parts of the raw product are mixed at 70°–100° with 1400 parts of sulfuric acid of 66° Bé, while well stirring. When the strong evolution of hydrochloric acid has ceased, the mass is poured on ice. The precipitated raw product is freed from a small amount of by-products by dissolving it in a caustic soda solution and again precipitating this solution with an acid. In this manner the pure 2.5-dichloro-terephthalic acid corresponding to the formula:

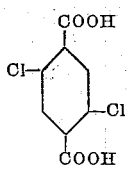

is obtained. It melts about 300°. Its dimethylester melts at 137°–138°, whereas 131°–132° is mentioned as melting point in Berichte der deutschen chemischen Gesellschaft, vol. 21, page 1960.

*Example 3*

Into 73 parts of mono-bromo-para-xylene, bromine is introduced at 120°–150° drop by drop, while stirring and exposing to an intense light, until no more bromine is absorbed. In this manner 160 parts of bromine are taken up. At ordinary temperature the mass solidifies in a crystallized form. The new mono-bromo-terephthalic hexabromide of the formula:

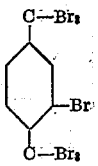

may be isolated in a pure state in the usual manner. It is at ordinary temperature a crystallized substance, boiling under atmospheric pressure above 300°.

In order to saponify the mono-bromo-terephthalic hexabromide, the raw product is introduced into an excess of sulfuric acid and the mixture is heated to 120°–130° until no more hydrobromic acid splits off. The mass is worked up as described in the foregoing examples. The 2-bromo-terephthalic acid thus obtained corresponds to the formula:

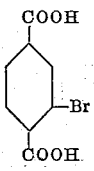

It represents, when recrystallized from alcohol, colorless crystals melting above 300°, as described in literature (Berichte der deutschen chemischen Gesellschaft, vol. 12, page 619).

*Example 4*

When 2.5-dibromo-1.4-dimethyl-benzene is used as starting material and the process is carried out otherwise as described in Example 3, the new 2.5-dibromo-terephthalic hexabromide is obtained. It shows similar properties as the above mentioned hexahalides and may be likewise saponified to the corresponding 2.5-dibromo-terephthalic acid which is already described in literature (Gazzetta chimica italiana, vol. 18, page 309).

I claim:

1. A process which comprises halogenating entirely in the side chains by means of free members of the group consisting of chlorine and bromine a paraxylene halogenated in the nucleus and corresponding to the general formula

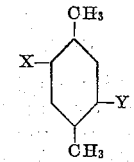

wherein X means hydrogen, chlorine or bromine and Y means chlorine or bromine.

2. A process which comprises halogenating entirely in the side chains by means of free members of the group consisting of chlorine and bromine while exposing to light a paraxylene halogenated in the nucleus and corresponding to the general formula

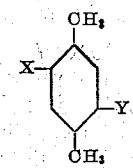

wherein X means hydrogen, chlorine or bromine and Y means chlorine or bromine.

3. As new products the halogen-terephthalic-hexahalides of the formula:

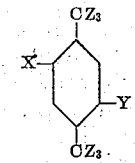

wherein X means hydrogen, chlorine or bromine, Y and the Z's mean chlorine or bromine, which products are nearly colorless liquids crystallizing at lower temperatures, boiling under the ordinary pressure above 300° C., insoluble in water, soluble in organic solvents, capable of being saponified to the corresponding halogen-terephthalic acids.

4. In the process for producing chloro-derivatives of the terephthalic acid the step which comprises chlorinating entirely in the side chains by means of free chlorine a paraxylene derivative chlorinated in the nucleus and corresponding to the general formula:

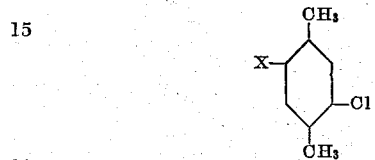

wherein X means chlorine or hydrogen.

5. As new products the chloro-terephthalic-hexachlorides of the formula:

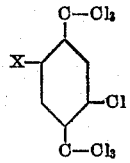

wherein X means hydrogen or chlorine, which products are nearly colorless liquids crystallizing at lower temperatures, boiling under the ordinary pressure above 300° C., insoluble in water, soluble in organic solvents, capable of being saponified to the corresponding chloro-terephthalic acids.

In testimony whereof, I affix my signature.

HANS SCHINDHELM.